United States Patent

[11] 3,590,955

[72] Inventor John C. Rau
Southfield, Mich.
[21] Appl. No. 886,712
[22] Filed Dec. 19, 1969
[45] Patented July 6, 1971
[73] Assignee General Motors Corporation
Detroit, Mich.

[54] ENGINE OIL PAN
6 Claims, 3 Drawing Figs.
[52] U.S. Cl. .................................................. 184/6 B,
184/103
[51] Int. Cl. ...................................................F01m 11/06
[50] Field of Search ........................................... 184/6, 6 B,
103, 103 A, 106

[56] References Cited
UNITED STATES PATENTS

| | | | |
|---|---|---|---|
| 1,989,816 | 2/1935 | Meyer | 184/6 B |
| 2,022,898 | 12/1935 | Niven | 184/6 B |
| 2,208,912 | 7/1940 | Simpson | 184/103 A |
| 2,440,815 | 5/1948 | Wharam et al. | 184/6 B |
| 2,938,601 | 5/1960 | Brafford | 184/106 X |

Primary Examiner—Manuel A. Antonakas
Attorneys—Jean L. Carpenter and Arthur N. Krein ABSTRACT: An oil pan assembly for the combustion engine in a motor vehicle in which an oil pan of suitable configuration is provided with baffles therein to provide an upper oil collecting chamber and a lower sump chamber in communication with each other through float valve controlled drain openings, the float valves being responsive to the relative oil level in the sump chamber.

PATENTED JUL 6 1971 3,590,955

INVENTOR
John C. Rau
BY
Arthur N. Krein
ATTORNEY

1

ENGINE OIL PAN

This invention relates to an oil pan and specifically to an oil pan for an internal combustion engine for use in a motor vehicle.

It has long been a problem in the engine of motor vehicles to maintain a satisfactory oil level within the oil pan of the engine under all vehicle operating conditions. When the vehicle is stationary, the oil seeks the lowest level within the oil pan which is normally the oil sump portion of the oil pan, the oil pump intake usually being located in this sump portion. When the vehicle is being driven upgrade, the oil tends to shift to the rear of the oil pan whereas when the vehicle is being driven downgrade, the oil tends to shift to the front of the reservoir. Under certain conditions, this movement of the oil within the oil pan is sufficient so as to uncover the pump intake to permit air to enter into the oil pump in lieu of oil. Similar conditions are also obtained during sudden accelerations and decelerations and during high speed vehicle maneuvering.

Accordingly, the primary object of the invention is to improve an engine oil pan structure whereby it is adapted to retain a supply of oil to provide adequate and continuous engine oil lubrication during high speed vehicle maneuvering or off-road operating conditions.

Another object of this invention is to improve an engine oil pan to provide a partially closeable oil sump portion in the oil pan which will retain an oil supply therein under conditions of severe vehicle inclination or strong centrifugal forces.

These and other objects of the invention are attained by means of an oil pan construction having a lower sump portion and upper and lower connecting baffles within the oil pan, both of the baffles sealing against the sides of the oil pan. The upper baffle closely surrounds the crankshaft of the engine and includes valve openings connecting with the space below a flat lower baffle. Float valves in the openings are arranged to close the openings to prevent inclination or side forces on the oil pan from partially emptying the sump so as to starve the oil pump.

For a better understanding of the invention, as well as other objects and further features thereof, reference is had to the following detailed description of the invention to be read in connection with the accompanying drawings, wherein.

Figure 1:
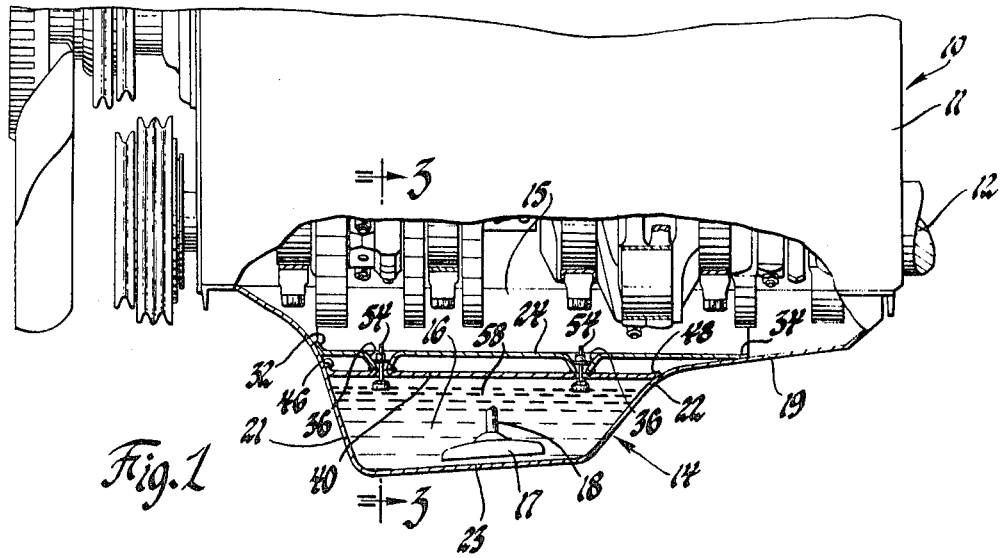
FIG. 1 is a side view of an internal combustion engine having an oil pan constructed in accordance with the invention, parts of the oil pan being broken away to show details of its structure.

Referring now to FIG. 1, there is shown an internal combustion engine 10 having a cylinder block 11 with a conventional crankcase 12 suitably journaled therein. Secured to the bottom of the cylinder block is an oil pan assembly in accordance with the invention, generally designated 14 of suitable configuration to suitably enclose the underside of the cylinder block. The oil pan assembly 14 is provided with a depressed lower portion to form an oil sump chamber 16 in which is mounted a conventional oil inlet 17 connected by conduit 18 to an oil pump, not shown, to supply oil for lubricating the parts of the engine which normally require lubrication.

The oil pan assembly 14 of the invention can be constructed in a number of ways to provide an upper oil collecting chamber 15 and the lower oil sump chamber 16 in communication with each other through float valve controlled drain openings to be described hereinafter, the float valves being positioned to be responsive to the relative oil level in the lower oil sump chamber.

For ease in manufacturing, the oil pan assembly 14, in the preferred embodiment shown, includes a unitary oil pan 19 provided with upper and lower baffles, 24 and 40, respectively to form the upper oil collecting chamber 15 open at the top to permit oil from the engine to drain into this chamber, and the lower oil sump chamber 16.

As shown in the figures, the unitary oil pan 19 has sidewalls 20, front and rear end walls 21 and 22, respectively, and a bottom panel 23 defining a reservoir for oil.

Figure 2:
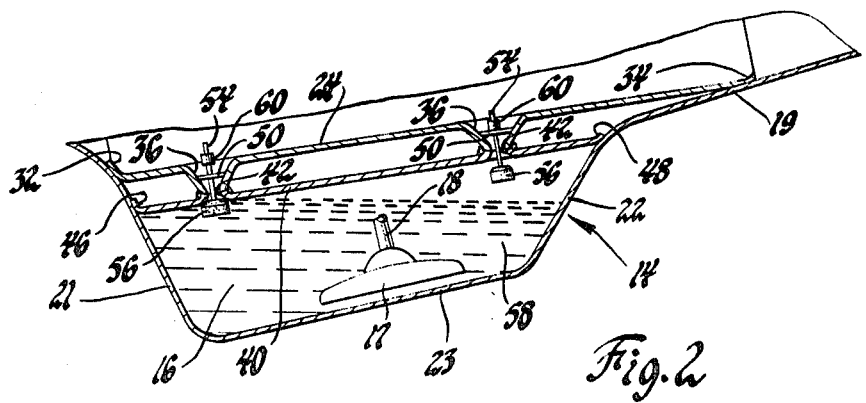
FIG. 2 is a partial view similar to FIG. 1 illustrating the oil pan in the position it would be in as a vehicle is driven downgrade; and, FIG. 3 is a view taken along line 3–3 of FIG. 1.
Figure 3:
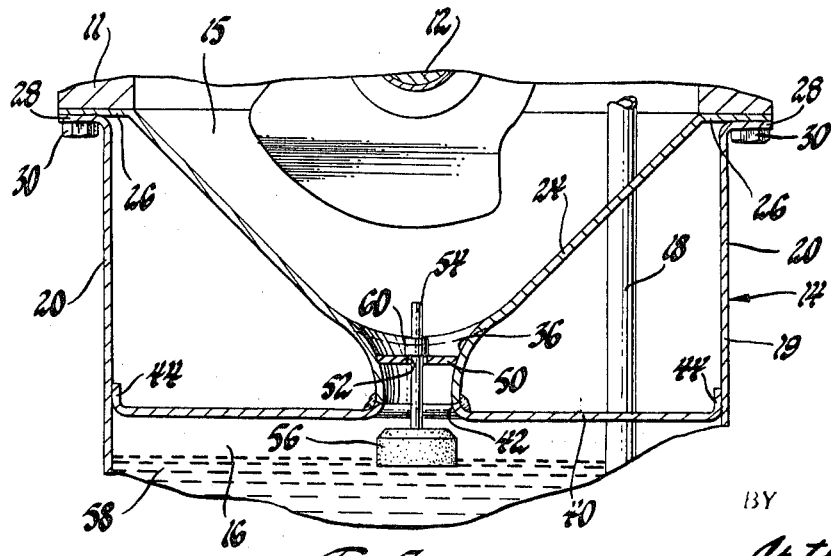

As shown more clearly in FIG. 3, the upper baffle 24 is channel-shaped in section and extends the length of the oil pan 19 beneath and to the sides of the engine crankshaft 12. The upper baffle 24 is preferably suitably sealed against the sides of the oil pan 19 as, for example, in the embodiment illustrated, the upper baffle 24 is provided with longitudinal flange portions 26 which extend over the side flange portions 28 of the oil pan 19, both flanges being suitably apertured to receive the bolts 30 by which this structure is secured to the bottom portion of the cylinder block 11. The lateral front and rear end flange portions 32 and 34, respectively, of the upper baffle 24 can be positioned to merely abut against the lateral front and rear end walls 21 and 22, respectively, of the oil pan 19, as shown, or if desired, they can be welded to these surfaces. The upper baffle 24 is thus positioned to form a drain trough in which oil dropping from the crankshaft, for example, will flow by gravity down the inner surface of this baffle and drain into the circular depressed drain spouts 36 formed in the bottom of the trough portion of the upper baffle 24. It is preferred that at least two drain spouts 36 be provided, located at the front and rear, left and right ends as seen in FIGS. 1 and 2, of the upper baffle.

Positioned beneath the upper baffle 24 is the lower baffle 40 herein shown as a flat plate provided with drain openings 42 in alignment with the drain spouts 36 of the upper baffle 24. The lower baffle is suitably positioned within the oil pan 19 so that its peripheral edges are in substantial sealing engagement with the sides of the oil pan and with the upper baffle 24. This can be accomplished by either welding the lower baffle to the depressed drain spout of the upper baffle with the side flanges 44, front flange 46 and rear flange 48 of the lower baffle merely abutting against the inner surfaces of the sidewalls 20, front wall 21, and rear wall 22 of the oil pan or by welding these peripheral upturned flanges of the lower baffle to these walls of the oil pan.

An open bearing member 50 is suitably secured within each of the drain spouts 36 and each is provided with a bearing aperture 52 therein to slideably receive the valve stem 54 of a float valve 56 adapted to seal the apertures in the lower baffle. As shown in FIG. 1, the float valve 54, under normal level road operating conditions, will fall by gravity into contact with the oil 58 in the sump chamber 16 or its downward movement will be restrained by stops 60 secured to the valve stems 54, so that under normal conditions, oil from the upper baffle 24 can drain down through either one of the drain spouts 36 and flow into the sump chamber 16. However, during violent maneuvering of the vehicle or while the vehicle is going up or down a steep incline, the oil level will shift in the sump to a position, for example, as shown in FIG. 2, which illustrates the oil level during vehicle motion downgrade, at which time the buoyancy of the front float valve 56, as shown in FIG. 2, will cause the float valve to rise into sealing engagement with the aperture 42 in the front lower baffle to thereby prevent the oil 58 from leaving the sump chamber 16 to flow into the upper or collecting chamber 15 and thereby reducing the oil level sufficiently in the sump chamber 16 to uncover the oil inlet 17. In the meantime, oil can still drain from the rearward portion of the upper baffle through the rear drain spout 36, right-hand spout of FIG. 2, into the sump chamber 16 to replenish the supply of oil therein. When the oil level in the sump chamber drops away from the lower baffle, the float valve 54 will again drop and allow any oil that has accumulated in the drain spout 36 to flow into the sump chamber 16. Of course, when the oil pan is tilted in the opposite direction, the rear or right-hand float valve, as seen in FIG. 2, will move upward to close the rear drain opening while allowing the forward drain spout to remain unblocked by its respective float valve 56. It is apparent that the oil level, as influenced by vehicle maneuvering, will effect the opening or closing of the float valves 56 in a manner as described above in regard to FIG. 2.

With the oil pump, not shown, mounted within the cylinder block 11, the conduit 18 from oil inlet can extend through suitable apertures, not shown, in the upper and lower baffles 24 and 40 to the oil pump. Of course, if desired, the conduit 18 can also be extended through a suitable aperture, not shown, in a sidewall of the oil pan when, for example, the oil pump, not shown, is mounted externally of the cylinder block 11.

With the arrangement described above, there is provided a structure which will automatically retain oil in the sump portion of the oil pan at a sufficient level during all vehicle maneuvering to completely cover the inlet 20 to the oil pump of the engine.

What I claim is:

1. An oil pan assembly for an internal combustion engine including wall means providing an upper collecting chamber and a lower sump chamber interconnected to each other by at least a first drain opening and a spaced apart second drain opening, valve support means secured within each of said first drain opening and said second drain opening, and float valve means in said lower sump chamber supported by said valve support means for movement relative thereto whereby each of said float valve means is independently movable from a first position blocking the said drain opening with which it is associated to a second position in which said drain opening with which it is associated is unblocked by said float valve means.

2. An oil pan assembly according to claim 1 wherein said wall means includes an oil pan having sidewalls, end walls and a bottom panel defining a sump for oil, an upper channel-shaped baffle in sealing engagement with said sidewalls and said end walls of said oil pan to provide said upper collecting chamber, said upper baffle being provided with spaced apart drain spouts in the bottom portion thereof, and a lower baffle having spaced apart drain apertures therein, said lower baffle being positioned below said upper baffle in sealing engagement with said sidewalls and said end walls of said oil pan to form with said bottom panel said lower sump chamber with said apertures therein in alignment with said drain spouts of said upper baffle to form with said drain spouts said first and said second drain openings.

3. An oil pan assembly for an internal combustion engine, said oil pan assembly including an oil pan having sidewalls, end walls and a bottom panel defining a reservoir for oil, baffle means positioned within said oil pan and in sealing engagement with said sidewalls and said end walls of said oil pan to provide therewith an upper collecting chamber and a lower sump chamber, said baffle means including spaced apart longitudinal drain openings to provide communication between said upper collecting chamber and said lower sump chamber, valve support means secured within each of said drain openings, and float valve means extending into said lower sump chamber and supported by said valve support means for movement with respect to said drain openings from a first position blocking said drain openings to a second position in which said drain openings are unblocked by said float valves.

4. An oil pan assembly for an internal combustion engine according to claim 3 wherein said baffle means includes an upper channel-shaped baffle to form a drain trough, said upper baffle having longitudinally spaced apart drain spouts in the bottom portion thereof, and a lower baffle having spaced apart drain apertures therein, said lower baffle being secured to the underside of said upper baffle with said drain apertures of said lower baffle in alignment with said drain spouts of said upper baffle to form said longitudinal drain openings, said lower baffle forming, with said bottom panel and portions of said sidewalls and said end walls, said lower sump chamber.

5. In combination with an oil pan for an internal combustion engine in which the oil pan includes sidewalls, end walls and a bottom panel; an upper channel-shaped baffle in sealing engagement with said sidewalls and said end walls of said oil pan to provide an upper collecting chamber, said upper baffle being provided with spaced apart drain spouts in the bottom portion thereof, a lower baffle having spaced apart drain apertures therein, said lower baffle being positioned beneath said upper baffle in sealing engagement with said sidewalls and said end walls of said oil pan to form with said bottom panel a lower sump chamber, said apertures in said lower baffle being positioned in alignment with said drain spouts of said upper baffle, valve means including float means positioned to control the flow of oil through said drain apertures as determined by the level of oil in said lower sump chamber.

6. An oil control device for use in the oil pan of an internal combustion engine of a motor vehicle in which the oil pan has sidewalls, end walls and a bottom panel, said oil retention device including an upper channel-shaped baffle adapted to be positioned in sealing engagement with the sidewalls and the end walls of the oil pan to provide an upper oil collecting chamber, said upper baffle being provided with spaced apart longitudinal drain spouts in the bottom portion thereof, a lower baffle having spaced apart drain apertures therein, said lower baffle being secured to the underside of said upper baffle with said drain apertures therein in alignment with said drain spouts of said upper baffle, said lower baffle being adapted to engage the sidewalls and the end walls of the oil pan to form with the bottom panel thereof a lower sump chamber, valve support means secured within each of said drain spouts, and float valve means movably supported by said valve support means to extend into said lower sump chamber whereby said float valve means are adapted to open and close said drain apertures in response to the level of liquid in said lower sump chamber.